April 26, 1966 D. D. CHRISTENSEN ET AL 3,248,706

COMPUTER

Filed Sept. 27, 1961 7 Sheets-Sheet 1

INVENTORS
DONALD D. CHRISTENSEN
THOMAS W. KAMPE
BY [signature]
ATTORNEY

FIG. 3A (TRANSFER ORDER)

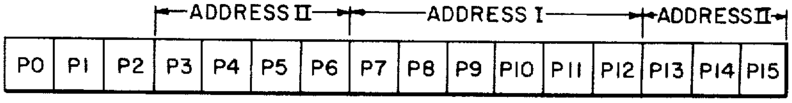

FIG. 3B (NON-TRANSFER ORDER)

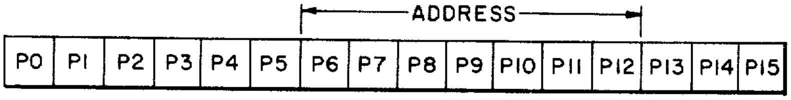

FIG. 4

| ORDER | ACTIVE BITS |
|---|---|
| ADD UPPER | $\overline{P0}$ P3 $\overline{P13}$ $\overline{P14}$ $\overline{P15}$ |
| SUBTRACT UPPER | $\overline{P0}$ P3 $\overline{P13}$ $\overline{P14}$ P15 |
| CLEAR AND ADD UPPER | $\overline{P0}$ P3 $\overline{P13}$ P14 $\overline{P15}$ |
| CLEAR AND ADD LOWER | $\overline{P0}$ P4 $\overline{P13}$ $\overline{P14}$ P15 |
| EXTRACT | $\overline{P0}$ P4 P13 $\overline{P14}$ $\overline{P15}$ |
| READ NEXT ORDER FROM DATA MATRIX | $\overline{P0}$ P4 P13 $\overline{P14}$ P15 |
| TRANSFER | P0 $\overline{P1}$ P2 |
| TRANSFER IF MINUS | P0 P1 P2 |
| READ IN MULTIPLICAND | $\overline{P0}$ P4 $\overline{P13}$ $\overline{P14}$ P15 |
| ADD AND FILL MULTIPLICAND | $\overline{P0}$ P3 P13 $\overline{P14}$ $\overline{P15}$ |
| SUBTRACT AND FILL MULTIPLICAND | $\overline{P0}$ P3 P13 $\overline{P14}$ P15 |
| MULTIPY AND ADD ACCUMULATOR | $\overline{P0}$ P4 $\overline{P13}$ P14 $\overline{P15}$ |
| SHIFT LEFT | $\overline{P0}$ P5 P13 $\overline{P14}$ $\overline{P15}$ |
| SHIFT RIGHT | $\overline{P0}$ P5 P13 $\overline{P14}$ P15 |
| DIVIDE | $\overline{P0}$ P3 P13 P14 $\overline{P15}$ |

April 26, 1966 D. D. CHRISTENSEN ET AL 3,248,706

COMPUTER

Filed Sept. 27, 1961 7 Sheets-Sheet 5

April 26, 1966 D. D. CHRISTENSEN ET AL 3,248,706

COMPUTER

Filed Sept. 27, 1961 7 Sheets-Sheet 7

3,248,706
Patented Apr. 26, 1966

3,248,706

COMPUTER

Donald D. Christensen, Sun Valley, and Thomas W. Kampe, Covina, Calif., assignors to General Precision, Inc., a corporation of Delaware Filed Sept. 27, 1961, Ser. No. 141,074
4 Claims. (Cl. 340—172.5)

The present invention relates to electronic digital computational systems of the general purpose type of incremental type, and to combined general purpose and incremental computers. The invention relates more particularly to such an improved computational system in which orders and data are procured continuously from a single memory for high speed operation, with each successive order word leading its corresponding data word by one word period.

In the computational system of the invention, as noted above, orders and data are procured continuously from a single memory which may, for example, be a magnetic memory drum. The computational system to be described reads any particular order from the memory drum in a corresponding word period and executes that order on a corresponding data word during the following word period.

The orders referred to in the preceding paragraph are each stored as multi-digit binary number representing an order word in the embodiment to be described; and the order words are stored in a plurality of channels on the magnetic memory drum, with a plurality of order words being stored in successive sectors of each channel. Then, when a particular channel of the magnetic drum is selected, all of the order words stored in that channel are introduced in succession and in a serial bit-by-bit manner to the computer for execution in the sequence in which they are recorded in the successive sectors in the particular channel.

All the orders in the computer program may be stored on the magnetic memory drum in sequence in successive sectors of each channel, and from channel-to-channel, as predetermined by the particular program. Then, as the program proceeds, the orders are serially read in sequence from a first channel, and they are then serially read in sequence from a second channel, and so on.

The data referred to above is also stored as multi-digit binary numbers in a plurality of data words in channels on the magnetic memory drum, with a plurality of the data words being stored in successive sectors of each channel. Each of the above-mentioned order words includes a data address portion which signifies the data channel in which the data word to be operated on by the particular order is located. The sector position of the addressed data word in the indicated data channel must be such that a sector of the desired word is read out of the channel at the time the particular channel is addressed.

An object of the invention, therefore, is to provide a high speed electronic digital computational system which is constructed to operate with maximum speed capabilities of a serial computer at any selected clock frequency.

Another object of the invention is to provide an improved high speed computational system in which successive orders are executed in sequence in a continuous manner and without any "dead time" therebetween, and in which the data words designated by the different orders are selected from the memory with zero access time.

Yet another object is to provide such an improved high speed digital computational system which is relatively simple in its construction and in which the improved high speed capabilities thereof are obtained by relatively simple circuitry and associated components.

The features of the invention which are believed to be new are set forth in the claims. The invention itself, however, together with further objects and advantages, may best be understood by reference to the following description when taken in conjunction with the accompanying drawings, in which:

FIGURES 3A and 3B are a representation of the composition of different order words which are used in the embodiment of the computational system of the invention to be described herein;

FIGURE 4 is a table of a typical order structure for the computational system of the invention;

Figure 1:
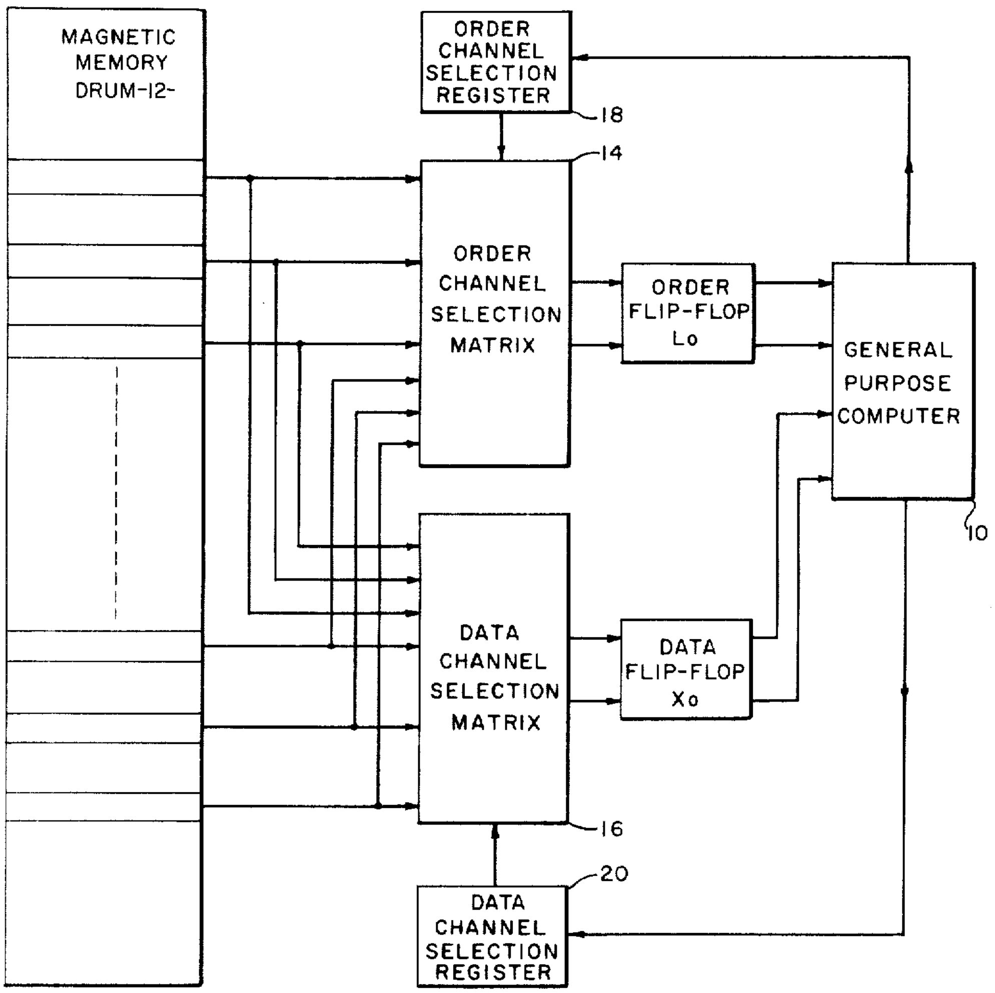
FIGURE 1 is a block diagram illustrating in schematic form a digital computational system constructed in accordance with the concepts of the present invention and which includes a general purpose computer.

The digital computer system of FIGURE 1 includes a block 10 which is designated as "general purpose computer." This block includes all the usual components of, for example, a general purpose computer, with the exception of the memory and the selection circuitry associated with the memory.

The memory of the system of FIGURE 1 is illustrated as 12. This memory may be a usual magnetic memory drum on which information is stored in a plurality of adjacent channels. As indicated above, and in accordance with well known and usual computer practice, the informtion on the drum is stored in the form of multi-digit binary numbers, usually known as order words and data words. The order words and data words are stored in successive sectors on each channel on the magnetic memory drum 12. One or more read heads is associated with each channel on the drum 12 and magnetically coupled thereto, and when a channel is selected by the logic selection circuitry, the corresponding read head introduces to the computer in serial manner the binary numbers representing the order or data words stored in the selected channel.

The words stored in the sectors of the different channels of the drum 12 may be, as mentioned, "order words" or "data words." An order word, as is well known, indicates to the computer the type of operation to be performed when the particular order is executed. Each order word also includes a portion which designates the channel in which the data word to be operated upon is located. Each data word, on the other hand, represents the operand which is operated upon by the corresponding order word.

In accordance with the concepts of the illustrated embodiment of the invention, a plurality of order words may be stored in the sectiors of each of a selected group of channels on the drum 12. Then, when the computer program is initiated, the order word in the first sector of the first channel of the memory drum 12 to be selected is read and executed, then the order in the second sector of that channel is read and executed, and so on. This successive reading execution of the order words continues until a "transfer" order is encountered in the first channel. In response to the "transfer" order, the system then passes to the next selected order channel on the drum 12, and the order words in the successive sectors in the latter channel are read successively and executed. This procedure continues on a continuous basis, until each order word in the computer program has been read and executed. It should be pointed out, that as any particular order is being executed, the next succeeding order is being read into the computer so that it will be ready for execution during the following word time.

As indicated above, each non-transfer order contains an address portion which designates the channel on the drum where the data to be acted upon by the order is located. Therefore, as each order is executed, the data addressed by that order must be read out of the memory drum into the computer so that it may be acted upon.

The schematic block diagram of FIGURE 1 includes an order channel selection matrix 14 and a data channel selection matrix 16. The blocks 14 and 16 may be selectively coupled to any of the channels on the magnetic memory drum 12, as illustrated, to provide flexibility in the storage of orders and data on the memory drum.

As illustrated in the diagram of FIGURE 1, the different channels on the drum 12 are coupled to the order channel selection matrix 14. This coupling, of course, is through the usual read head and read amplifier components which, for purposes of simplicity, are not shown in FIGURE 1. An order channel selection register 18 is coupled to the order channel selection matrix 14. The order channel selection register 18 may be a usual shift register, and it is under the control of "transfer" orders read into the computer 10.

The order channel selection matrix 14 may have any appropriate known configuration, and it is controlled in known manner by the order channel selection register 18. The control of the order channel selection matrix 14 is such that the different channels on the magnetic drum 12 which contain order words are selected upon the execution of certain "transfer" orders, as will be described. The output from the order channel selection matrix 14 is coupled to an order flip-flop L*o*, and the output of the flip-flop L*o* is fed to the computer 10. The order words read into the computer 10 appear in serial form on a bit-by-bit basis at the output of the order flip-flop L*o*. As noted above, the order words are fed to the computer 10 on a continuous serial basis with no "dead time" between successive orders.

In like manner, the data channel selection matrix 16 selects different ones of the channels on the drum 12 on which data words are recorded. The data channel selecton matrix 16 may have any appropriate configuration, and it is controlled by a data channel selection register 20. The data channel selection register 20 may be a usual shift register, and it is set in each instance by the address portion of the order word introduced to the computer 10, so that the corresponding data word addressed by the order word may be selected and read into the computer 10. The selected data words are passed in succession and serially in bit-by-bit progression through the data selection matrix 16 to a data flip-flop X*o*. Therefore, the data flip-flop X*o* produces, in a serial bit-by-bit manner, the data words addressed by the successively executed order words.

As described above, there is a high degree of flexibility in the system in that any of the channels on the magnetic memory drum 12 may be selected by either of the matrices 14 and 16. This means that orders and data may be stored at any place on the drum convenient to the programmer, and the program is established so that the order selection matrix 14 and the data selection matrix 16 function to select the proper channels as the program proceeds.

Figure 2:
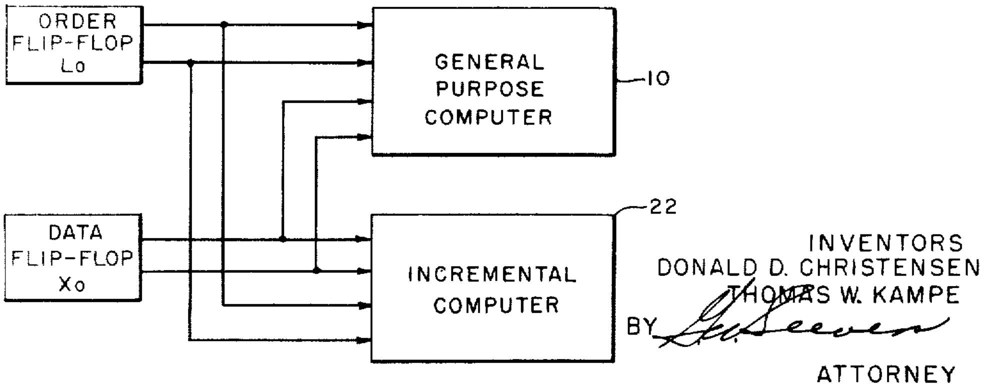
FIGURE 2 is a fragmentary block diagram illustrating the manner in which the computational system of FIGURE 1 may include, in addition to the general purpose computer mentioned above, an incremental computer, or digital differential analyzer.

As indicated in FIGURE 2, further operational flexibility may be achieved in the computational system by including an incremental computer, or digital differential analyzer, 22 in the computational system. For the embodiment of FIGURE 2, data for the incremental computer may be stored in separate data channels on the magnetic memory drum 12, and the data channel selection matrix 16 may function under the control of particular ones of the order words selected by the order channel selection matrix 14 to select data for the incremental computer 22.

A table of typical orders for use in the general purpose computer 10 of FIGURE 1 is shown in FIGURE 4. The table of FIGURE 4 represents a partial list of the order structure of the general purpose computer 10, and represents only the orders which utilize the order selection matrix 14 of FIGURE 1.

As shown in FIGURES 3A and 3B, two types of order words are used in the computational system under consideration. These order words include a first group known as "transfer" orders, as shown in FIGURE 3A; and a second group, known as "non-transfer" orders, as shown in FIGURE 3B.

The transfer orders designate that the next group of order words will be taken from successive sectors of a different channel on the memory drum 12, the new channel being indicated by an address portion of the transfer order. The non-transfer orders are the working orders of the system; and each such order contains the address of the data word to be operated on by that order, and a portion indicating the operation to be performed on the data word. Each non-transfer order is followed by the next non-transfer order in the particular channel, insofar as execution of these orders is concerned, and this continues until a transfer order is reached in that channel which, as mentioned, shifts the order selection to a new channel.

Each of the order words of FIGURES 3A and 3B is represented by a 16-bit binary number, the bits being represented as P0–P15 respectively, as illustrated.

The code for each order word is set out in the table of FIGURE 4. For all the non-transfer order words of FIGURE 3B, five bits are necessary to program the orders. For the transfer order words of FIGURE 3A, on the other hand, three bits only are required to program the different orders.

The data channel selection matrix 16 must be set by P14 bit time by any particular non-transfer order passed through the order channel selection matrix 14 to assure that the corresponding read head switching operations will be completed in time for the next word time. This enables the selected data word from the addressed data channel to be read into the data channel selection matrix 16 for execution during the following word time. Likewise, the order channel selection matrix 14 must be set by P14 bit time by a transfer order for the same reasons.

The transfer orders which change the order channel selection matrix 14, or the non-transfer orders which change the data channel selection matrix 16, therefore, must be recognized at P14 bit time. By grouping the orders in general classes of transfer and non-transfer orders, each group can be detected at P0 bit time, and the desired switching can be initiated at the following P14 bit time and before the complete order has entered the order input register of the computer.

As noted above, all orders are classified into two main groups, namely transfer orders and non-transfer orders. A transfer order word, as shown in FIGURE 3A, is a double address order word; whereas the non-transfer order word, as shown in FIGURE 3B, is a single address order word.

A transfer order word indicates by its first address, the channel at which the next order word is to be selected, and it indicates at its second address the sector in that channel at which the next order is to be taken.

For the non-transfer orders, the single address identifies merely the channel, and the corresponding data word must be programmed into an appropriate sector in that channel to be read out during the following word time upon the selection of a particular channel.

In the transfer order word of FIGURE 3A, the P0 bit is always a "1" to indicate a transfer order (as shown in the table of FIGURE 4); and in the non-transfer order word of FIGURE 3B, the P0 bit is a "0" to indicate a non-transfer order (as also shown in the table of FIGURE 4). The bits P1 and P2 of the transfer order word are used to designated the particular type of transfer order involved. For example, as listed in the table of FIGURE 4, $P0.\overline{P1}$ represents a general transfer, and $P0.P1$ represents a conditional transfer. The first of the two addresses of the transfer order word of FIGURE 3A is located at the P7–P12 bit positions, as shown, and the second address is located at the P3–P6, P13–P15 bit positions, as also shown.

In the non-transfer order word of FIGURE 3B, and as shown in the table of FIGURE 4, the P1 and P2 bit positions are not used and should be programmed as 0's. The P3 and P4 bit positions are used to signify two groups of non-transfer orders which do not involve a writing operation, and the P5 bit position is used to signify a group of write orders which will not be dealt with herein. The P6–P12 bit positions in the non-transfer order word are used to designate the channel address of the data word on which the order is to be executed; and the P13–P15 bit positions in the non-transfer order word are used to identify each particular order within the above-mentioned different general groups.

As noted above, the different orders of a typical general purpose computer for use in the computational system of the invention are set out in the table of FIGURE 4, together with the identifying code for each order. It should be pointed out that the orders listed in the table are in each instance selected in a particular word time and executed one word time later. Therefore, the data word to be acted on by any particular non-transfer outer should be programmed in a sector location which is displaced one sector with respect to the corresponding order word.

The "add upper" order $(\overline{P0}.P3.\overline{P13}.\overline{P14}.\overline{P15})$ in the table of FIGURE 4 requires that the data word from the next sector of the memory channel addressed by the order be added to the contents of a first accumulator register in the arithmetic unit of the general purpose computer 10, the first accumulator register will be referred to herein as the "upper accumulator."

The "subtract upper" order $(\overline{P0}.P3.\overline{P13}.\overline{P14}.P15)$ in the table of FIGURE 4 requires that the data word from the next sector of the memory channel addressed by the order be subtracted from the contents of the upper accumulator.

The "clear and add upper" order $(\overline{P0}.P3.\overline{P13}.P14.\overline{P15})$ requires that the upper accumulator be cleared to zero, and that the data word from the next sector of the memory channel addressed by the order be shifted into the upper accumulator.

The "clear and add lower" order $(\overline{P0}.P4.\overline{P13}.\overline{P14}.\overline{P15})$ requires that a second accumulator register in the arithmetic unit of the general purpose computer 10, to be referred to as the "lower accumulator," be cleared to zero and that the data word from the next sector of the memory channel addressed by the order be added into the lower accumulator.

The "extract" order $(\overline{P0}.P4.P13.\overline{P14}.\overline{P15})$ requires that the data word of the next sector of the memory channel addressed by the order be compared bit-by-bit with the contents of the upper accumulator, with a "1" being returned to the upper accumulator if both bits in any instance are 1's. All other combinations return a 0 to the upper accumulator.

The "read the next order from the data matrix" order $(\overline{P0}.P4.P13.\overline{P14}.P15)$ causes the next order to be taken from the data channel selection matrix 16 of FIGURE 1 through the flip-flop X0; rather than from the order channel selection matrix 14 through the flip-flop L0.

The general "transfer" order $(P0.\overline{P1}P2)$ causes the next order to be selected from a selected sector of another channel, so that the successive orders in the latter channel may be sequentially introduced to the computer. The channel "address I" (P7–P12) of the transfer order word in FIGURE 3A indicates the channel of the next order, as explained above, and the sector "address II" (P3–P6, P13–P15) of the transfer order word designates a setting for a delay counter in the computer.

The new order channel will not be read through the order selection matrix 14 of FIGURE 1 to the order flip-flop L0 until a delay counter to be described counts down to zero from its setting established by the sector address portion of the transfer order. It should be noted that the order channel is changed by the matrix 14 immediately upon recognition of the order, and any delay programmed will take place in the new order channel until the desired sector for the addressed order is reached. The transfer order is never read into the order register of the computer.

The conditional "transfer if minus" order $(P0.P1.P2)$ is similar to the general transfer order $(P0.\overline{P1}.P2)$; the only difference being that the conditional transfer order will be ignored if the upper accumulator is not minus.

The "read in multiplicand" order $(\overline{P0}.P4.\overline{P13}.\overline{P14}.P15)$ requires that the data word in the next sector of the memory channel addressed by the order be read into the multiplicand register of the arithmetic unit of the general purpose computer.

The "add and fill multiplicand" order $$(P0.P3.P13.\overline{P14}.\overline{P15})$$

requires that the data word in the next sector of the memory channel addressed by the order be added to the contents of the upper accumulator, and that the sum be returned to the upper accumulator and then placed in the multiplicand register.

The "subtract and fill multiplicand" order $$(\overline{P0}.P3.P13.\overline{P14}.P15)$$

is the same as the previous order except that the data word from the memory is subtracted rather than added.

The "multiply and add accumulator" order $$(\overline{P0}.P4.\overline{P13}.P14.\overline{P15})$$

specifies that the data word in the next sector of the memory channel addressed by the order be the multiplier and, as the product is formed, the product is shifted left one bit and passed to the adder of the arithmetic unit of the general purpose computer 10 before it is stored in the upper and lower accumulators. The least significant half of the product is stored in the lower accumulator and the most significant half is stored in the upper accumulator.

The "shift left" order ($\overline{P0}$.P5.13.$\overline{P14}$.$\overline{P15}$) specifies that the double length word held in the upper and lower accumulators be shifted left from one to sixteen bit positions. The address portion of the shift order specifies the number of bit positions the word is to be shifted.

The "shift right" order ($\overline{P0}$.P5.P13.$\overline{P14}$.P15) permits a dougle length word in both the upper and lower accumulators to be shifted right from one to 15 bit positions. The address portion of the order, as in the shift left order, designates the number of bit positions to be shifted.

The "divide" order ($\overline{P0}$.P3.P13.P14.$\overline{P15}$) causes the double length word in the accumulator to be divided by the data word in the next sector of the memory channel addressed by the order. At the end of the operation, the quotient is placed in the lower accumulator and the remainder is placed in the upper accumulator.

The present invention is concerned with the particular controls of the computational system under consideration, and not with the arithmetic operations performed by the general purpose computer 10. For this reason, the details of the arithmetic unit of the general purpose computer 10 will not be described herein.

Figure 5:
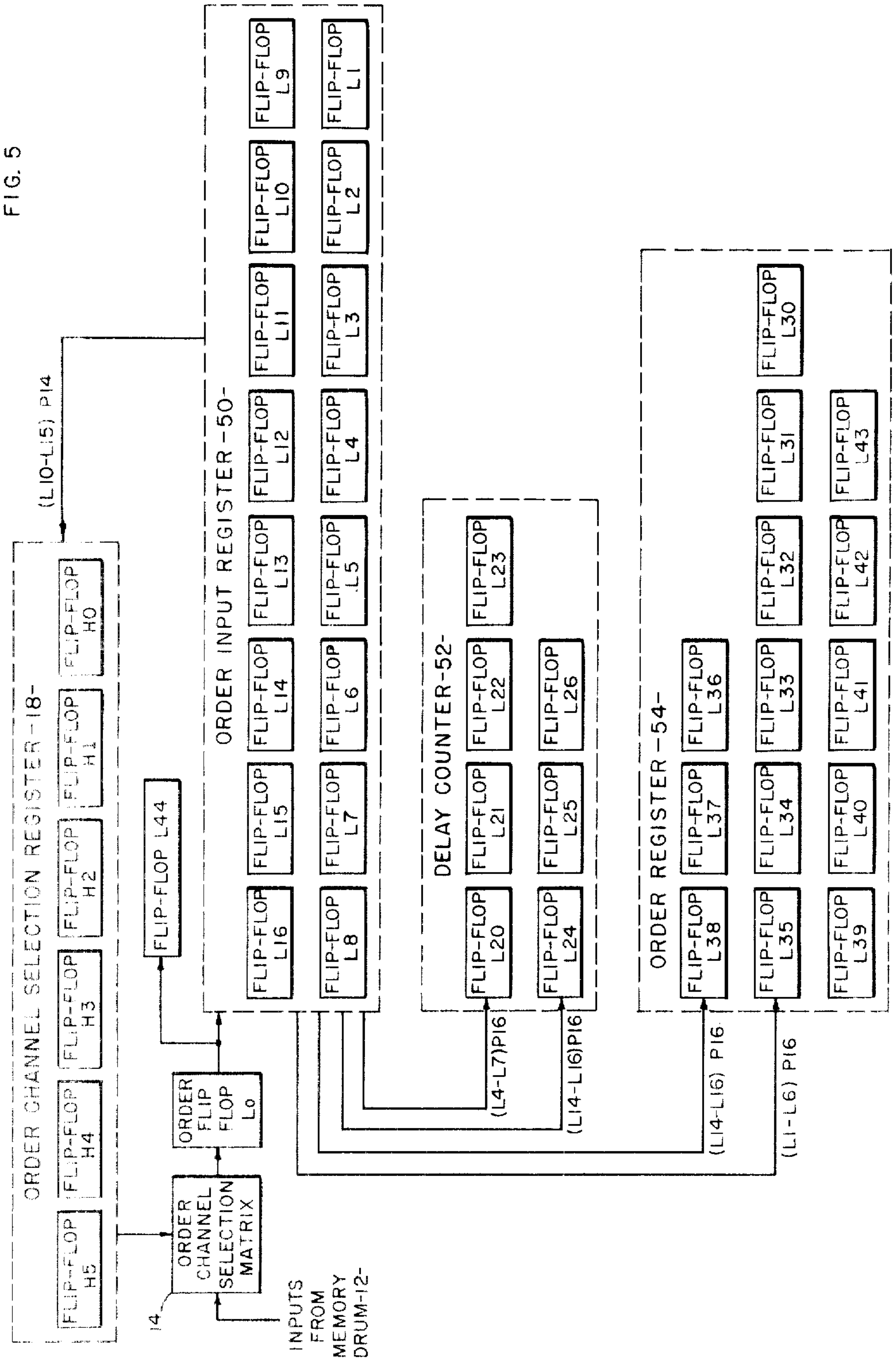
FIGURE 5 is a block diagram of a portion of the computational system to be described, illustrating the manner in which the order words are selected and stored in the system.

The general control portion of the general purpose computer 10 of FIGURE 1 and the manner in which the different orders are selected by the general purpose computer, is represented by the logic block diagram of FIGURE 5. As illustrated in FIGURE 5, the order channel selection matrix 14 of FIGURE 1 is controlled by the order channel selection register 18, and the selected information from the memory drum 12 is fed through the matrix 14 on a bit-by-bit serial basis to the order flip-flop L0. These operations have been described in conjunction with FIGURE 1.

The order channel selection register 18 includes a group of flip-flops H0–H5. These flip-flops are inter-connected in a usual shift register configuration. As noted above, the flip-flops in the order channel selection register 18 are set at P14 bit time, to provide sufficient time for head switching and transients to be suppressed, before the information is actually read through the matrix 14 to the order flip-flop L0.

As each order is selected and read through the order flip-flop L0, the particular order is shifted into an order input register 50 made up of the plurality of flip-flops L1–L16. These flip-flops are connected as a usual shift register, and each order is serially shifted bit-by-bit into the register 50 from the flip-flop L16 to the flip-flop L1. As noted above, when a particular order is partially shifted into the order input register, and at P14 bit time, the address portion of the particular order will be contained in the flip-flops L10–L15. If that order is a transfer order, its "address I" portion of FIGURE 3A will appear in those flip-flops at P14 bit time, and appropriate logic circuitry will cause the order channel selection register 18 to have its flip-flops set in accordance with the setting of the flip-flops L10–L15.

Therefore, the order channel selection matrix 14 will be caused to select the next order channel on the memory drum 12 at P14 bit time. The order under execution will then continue to be shifted into the order input register 50.

The general purpose computer 10 also includes a delay counter 52 which is made up of a first group of flip-flops L20–L23, and of a second group L24–L26. The delay counter is used for sector selection purposes. At P16 bit time, assuming that the order being shifted into the order input register is a transfer order, the first portion of the "address II" part of the order (FIGURE 3A) will be contained in the flip-flops L4–L7, and the second portion of the "address II" part of the order will be contained in the flip-flops L14–L16. The outputs from these flip-flops are introduced to the flip-flops of the delay counter 52 at P16 bit time to set an initial configuration into the delay counter.

The circuitry inter-connecting the flip-flops in the delay counter 52, and the logic for setting the delay counter, are extremely well known to the art, and a detailed showing or description of such circuitry will not be contained herein. As noted above, the delay counter counts down from its original setting to zero, and the next order from the selected order channel of the drum 12 is not fed through the matrix 14 until the delay counter reaches zero. This permits a particular sector of the selected order channel to be selected, and the selected sector contains the first order of the new group to be successively read from the newly selected channel.

The general purpose computer 10 also includes an order register 54, which is made up of a plurality of flip-flops L30, L33–L43. The function of this latter register, and the manner in which it is controlled, will be described subsequently.

The following is a somewhat more detailed description of the function of each of the flip-flops illustrated in the block diagram of FIGURE 5.

The flip-flop L0, as described above, is the output flip-flop of the order channel selection matrix 14. This flip-flop continually reads the order channel selection matrix, and transfers the output of the matrix on a serial bit-by-bit basis.

The flip-flops L1–L16 are included in the order input register 50. As noted above, these sixteen flip-flops are connected as a shift register, and the register accepts orders from the flip-flop L0 on a serial bit-by-bit basis, when the flip-flops L20–L26 of the delay sector selector counter 52 indicate a count of zero. The input flip-flop of the order input shift register is the flip-flop L16, as mentioned above. Under a specific order, and as also mentioned above, the order input shift register 50 can accept the output of the data matrix through the flip-flop X0 of FIGURE 1, instead of the output of the order matrix 14 through the flip-flop L0.

The flip-flops L20–L26 make up the delay sector selector counter 52. As mentioned, when the delay counter 52 is not in its zero state, no order can be read from the order flip-flop L0. When it is desired to change the channel on the magnetic memory 12 from which the orders are to be taken, it is possible to delay reading the read head of the newly selected channel until the proper sector arrives at that read head, this being achieved by the setting of the delay counter 52. The delay counter can be set to any number up to 127, for example. After a number has been set into the delay counter by the "address II" portion of the transfer order (FIGURE 3A), the delay counter 52 counts down one step for each sector on the drum. When the counter 52 reaches zero, it remains in the zero state until again changed by the "address II" portion of the next transfer order. This operation permits each successive order in the selected channel, starting with the selected sector, to be passed into the order input register 50, and the successive passing of orders in any selected channel continues until a new transfer order is encountered in that channel and which changes the order selection to a new channel.

The flip-flops L30–L38 make up the order register 54. While an order is being executed, it must be stored for at least one word time to complete the operation. The flip-flops L30–L38 of the order register 54 perform this function. As noted above, the transfer orders are never read into the order register 54.

At P16 bit time, the P0–P5 bits of a non-transfer order in the order input register 50 are transferred in a parallel manner from the order input register flip-flops L1–L6 into the flip-flops L30–L35 of the order register 54. At the same, the P13–P15 bits of the non-transfer order in the input register are transferred from the flip-flops L14–L16 of the order input register 50 to the flip-flops L36, L37, L38 of the order register 54.

The flip-flops L39–L43 in the order register 54 are used for storing special orders, such as multiplication and shifting orders that require two or three word times for execution. These multi-word time orders are held in special flip-flops L39–L43 of this register for their last word time. In this manner, the order register 54 is left free to execute another order.

The flip-flop L44 is for special addressing. If for any arithmetic operation, except divide and square root, the address portion of the arithmetic order is all 1's then this flip-flop is set true to permit the word following the order in the selected order channel to serve as its operand. This permits data to be stored in the selected order channel, if so desired.

Figure 6:
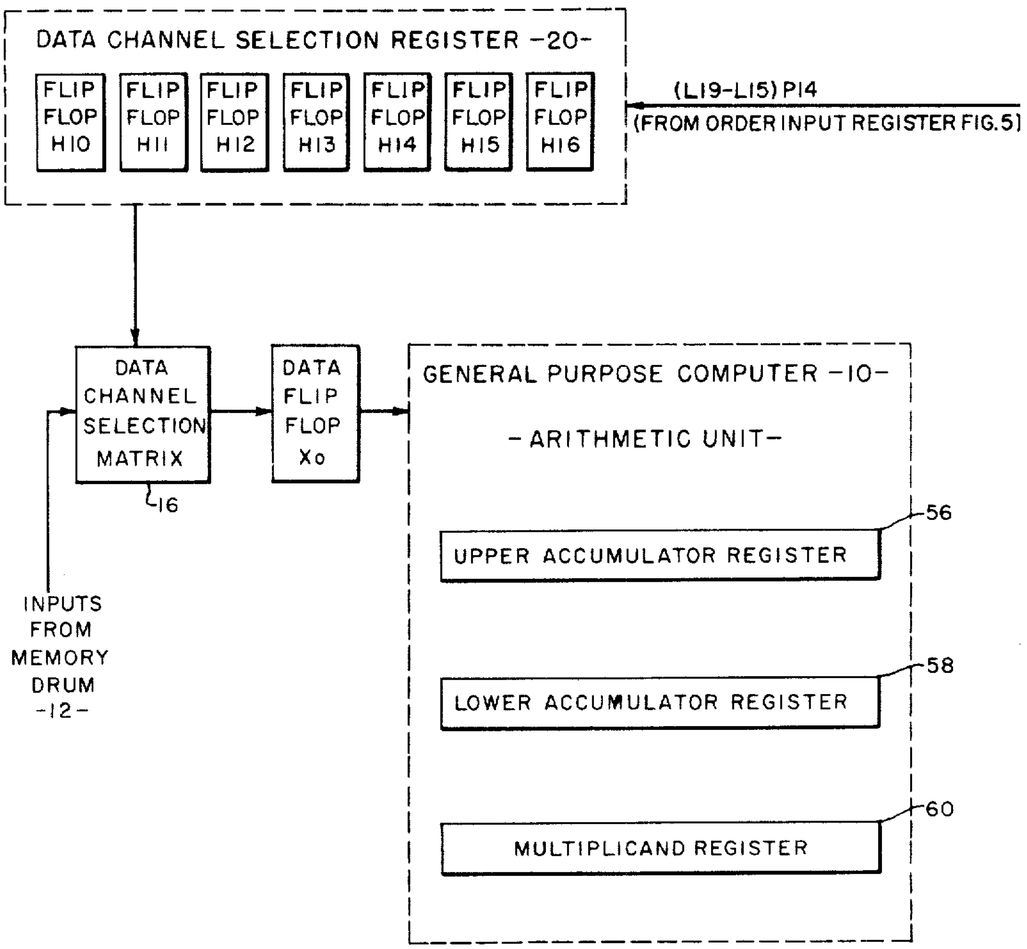
FIGURE 6 is a block diagram of a data control portion of the computational system of the embodiment of the invention to be described illustrating the manner in which the data words are selected in the system.

As shown in FIGURE 6, the data channel selection register 20 of FIGURE 1 is composed of a plurality of flip-flops H10–H16. These flip-flops are set at P14 bit time from the order input register 50 of FIGURE 5. At that time, the address of a non-transfer order in the order input register 50 is contained in the flip-flops L9–L15 of that register. The seven bits P6–P12 making up the address portion of the order (FIGURE 3B) then set the flip-flops H10–H16 in the data channel selection register 20. This enables a particular data channel to be selected by the data channel selection matrix 16 to derive the data word operand for the particular non-transfer order being executed.

The selected data word is read through the data flip-flop X0 to the general purpose computer 10, as mentioned above.

The arithmetic unit of the general purpose computer 10 includes an upper accumulator register 56, a lower accumulator register 58 and a multiplicand register 60. The details of the arithmetic unit form no part of the present invention, and, for that reason, will not be described in detail herein.

The flip-flops H0–H5 making up the order channel selection register 18 of FIGURE 5 hold the "address I" portion of a corresponding transfer order in the order input register 50. The setting of the flip-flops in the order channel selection register 18 can be changed only by a transfer order, as indicated by a "1" at the P0 bit position.

The flip-flops H10–H16 in the data channel selection register 20 of FIGURE 6, on the other hand, respond only to the non-transfer orders of FIGURE 3B, as indicated by a "0" at the P0 bit position. For any non-transfer order, whose address portion refers to a data channel on the memory drum 12, the data channel selection matrix 16 must be actuated a sufficient time before the actual transfer is to take place to allow head switching transients to die down. There is a two-bit delay before the output of any read head selected by the data channel selection matrix 16 will appear at the output of the data flip-flop X0, i.e., one bit for the read amplifier associated with the selected read head and one bit for the data flip-flop X0. Since the two spacer bits do not contain data, the earliest possible time to set the flip-flops H10–H16 of the data channel selection register 20 is four bit times ahead of the time required for the least significant bit to be present at the output of the flip-flop X0.

Therefore, the data address portion (P6–P12) of the non-transfer order is read into the data channel selection register 20 at P14 bit time, as mentioned above. The resulting seven bit binary number in the flip-flops H10–H16 of the register 20 will be decoded by the data channel selection matrix 16 into 128 addresses. The first 64 addresses, as will be described, refer to the general purpose memory, and an additional 36 will refer to the incremental memory channels on the drum 12.

The matrix control of the computational system of the invention will be described in more detail in conjunction with FIGURES 7, 8 and 9. It will be appreciated, that the system is such that the general purpose computer may select orders from any one of a plurality of general purpose order and data channels on the magnetic memory drum 12, and the system includes flexibility so that data or orders may be stored in any of the channels. In addition, data for the general purpose computer may be selected from any one of the data or order channels described above, or from any one of a plurality of incremental computer data channels on the memory drum 12. By the same token, data for the incremental computer 22 may be selected from any one of the incremental data channels on the drum 12.

Figure 7:
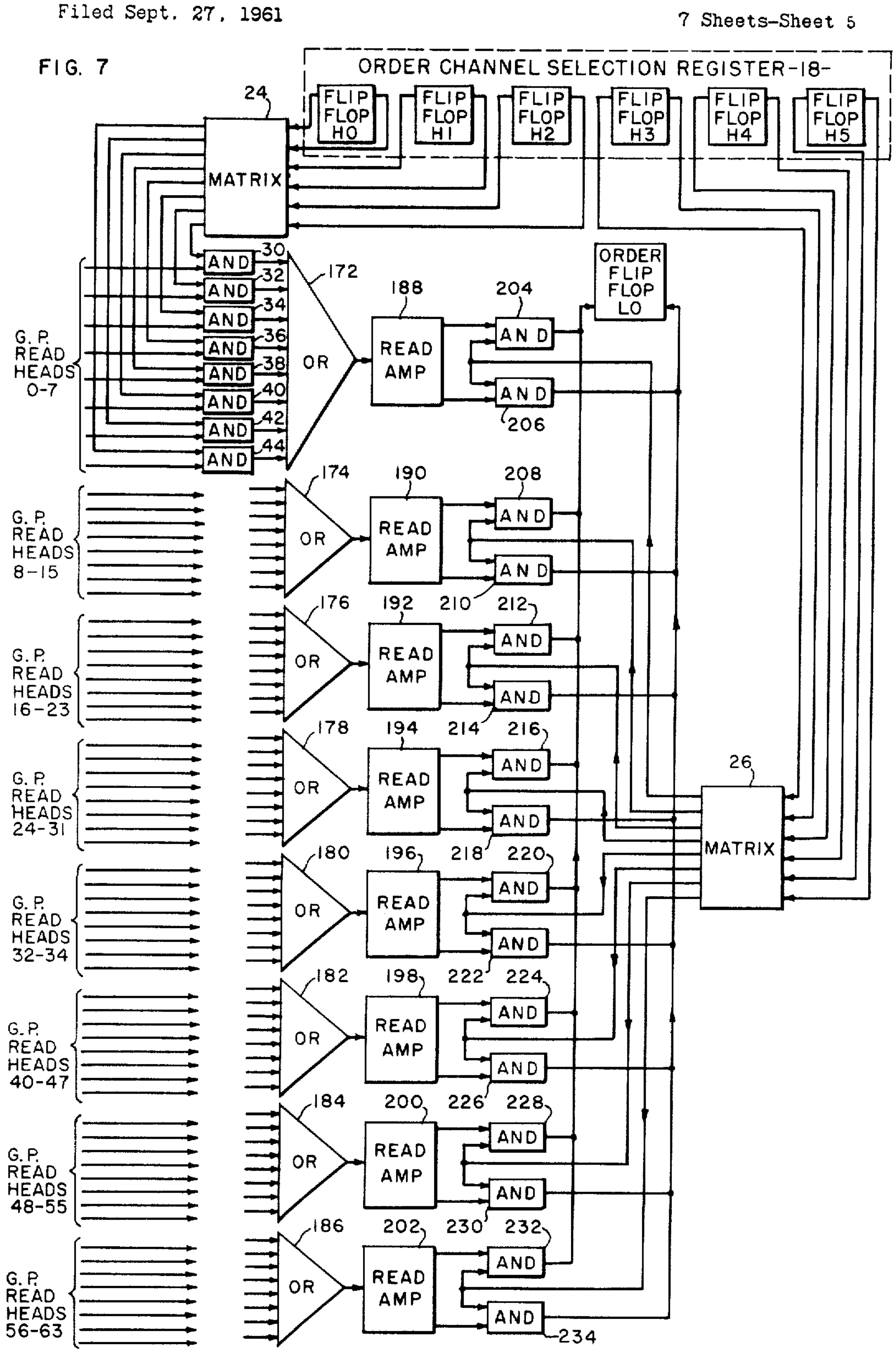
FIGURE 7 is a logic block diagram illustrating the manner in which the order words may be selected from different channels on a memory in the system to be described.

As indicated in FIGURE 7, and as described above, the order channel selection register 18 is composed of a plurality of flip-flops H0, H1, H2, H3, H4 and H5. The outputs of the flip-flops H0, H1 and H2 are introduced to a matrix 24 in FIGURE 7, and the outputs of the flip-flops H3, H4 and H5 are introduced to a matrix 26 in FIGURE 7. The matrix 24 and the matrix 26 make up a portion of the order channel selection matrix 14 of FIGURE 1. They may have any known configuration, and these matrices function in usual manner to provide a true gate signal at different ones of their output terminals in correspondence with different states of the flip-flops in the order channel selection register 18.

In the embodiment of FIGURE 7, it is assumed that the magnetic memory drum 12 (FIGURE 1) includes 64 general purpose channels which are capable of storing orders or data for the general purpose computer 10. As mentioned above, each of the 64 different channels on the memory drum 10 includes a general purpose read head (not shown), and these general purpose read heads are coupled to a corresponding plurality of "and" gates. The general purpose read heads 0–7 are coupled to respective "and" gates 30–44, and the other general purpose read heads are coupled to similar "and" gates (not shown), the latter "and" gates being grouped like the "and" gates 30–44. The output terminals of the matrix 24 are connected to corresponding ones of the "and " gates 30–44 in the illustrated group, and in like manner to corresponding ones of the "and" gates in the groups which are not shown. The "and" gates 30–42 are connected to an "or" gate 172, the "and" gates of the groups which are not shown are similarly connected to a plurality of "or" gates 174, 176, 178, 180, 182, 184 and 186.

Flip-flops, "and" gates and "or" gates are well known logic components and need no further description herein. As is well known, a flip-flop is a bi-stable relaxation oscillator; an "and" gate is constructed to produce a true output term when all its input terms are true; and an "or" gate is constructed to produce a true output term when any one of its input terms are true. In the ensuing description a "general purpose" read head will be construed as a read head reading a general purpose date or order channel on the memory drum 12 of FIGURE 1; and an "incremental" read head will be construed as one reading an incremental channel on the drum.

The "or" gates 172–186 are respectively coupled to a corresponding plurality of read amplifiers 188, 190, 192, 194, 196, 198, 200 and 202. The read amplifier 188 is coupled to a pair of "and" gates 204 and 206; the read amplifier 190 is coupled to a pair of "and" gates 208 and 210; the read amplifier 192 is coupled to a pair of "and" gates 212 and 214; the read amplifier 194 is coupled to a pair of "and" gates 216 and 218; the read amplifier 196 is coupled to a pair of "and" gates 220 and 222; the read amplifier 198 is coupled to a pair of "and" gates 224 and 226; the read amplifier 200 is coupled to a pair of "and" gates 228 and 230; and the read amplifier 202 is coupled to a pair of "and" gates 232 and 234.

The read amplifiers mentioned in the preceding paragraph may be constructed in any known manner, and each includes a flip-flop which is triggered from one state to the other in response to signals passed by the corresponding amplifier. It will be noted that each of the read amplifiers includes a pair of output leads. These output leads extend from the output terminals of the flip-flop included therein. The signal on one of the output leads from any particular read amplifier is true and the signal on the other output lead is false when a "0" is read by the corresponding read head; and the opposite condition occurs when a "1" is read by the corresponding read head.

The output terminals of the matrix 26 are respectively connected to the pairs of "and" gates 204 and 206, 208 and 210, 212 and 214, 216 and 218, 220 and 222, 224 and 226, 228 and 230, 232 and 234. The "and" gates 204, 208, 212, 216, 220, 224, 228 and 232 are all coupled to the set input terminal of the order flip-flop L0; and the "and" gates 206, 210, 214, 218, 222, 226, 230 and 234 are all coupled to the reset input terminal of the order flip-flop L0.

It will be evident from an examination of FIGURE 7 that the flip-flops H3, H4 and H5 in the order channel selection register 18 select which read amplifier of the illustrated read amplifier 118–202 will be effectively coupled to the set and reset input terminals of the order flip-flop L0. When the flip-flops H3, H4 and H5 assume any particular configuration, the matrix 26 develops a true signal on a particular one of its output leads, and this true signal enables the pair of "and" gates between a selected one of the read amplifiers and the set and reset input terminals of the order flip-flop L0.

The flip-flops H0, H1 and H2 in the order register 18, on the other hand, determine which general purpose read head of the corresponding group will be effectively coupled to the selected read amplifier. For any particular configuration of the flip-flops H0, H1 and H2, the matrix 24 develops an output signal on a corresponding one of its output leads. This output signal enables one of the "and" gates associated with the input of each of the read amplifiers. However, only the enabled "and" gate associated with the read amplifier selected by the matrix 26 will be effective in causing the signal from the corresponding read head to reach the order flip-flop L0. In this manner, any one of the 64 general purpose read heads may be effectively selected so that orders from the corresponding channel may pass through the order flip-flop L0.

In the system of FIGURE 7 the order channel selection register 18 serves in response to the "transfer" orders to select different ones of the general purpose read heads 0–63 to permit the information read from the corresponding channel on the memory drum 12 to be introduced in a serial bit-by-bit fashion to the order flip-flop L0. As pointed out above, these same channels may also be used to store data words, should the programmer so desire. The selection of the different general purpose read heads for the latter purpose is made in response to the "non-transfer" orders by the data channel selection register 20, and by the logic circuitry shown in FIGURE 8.

Figure 8:
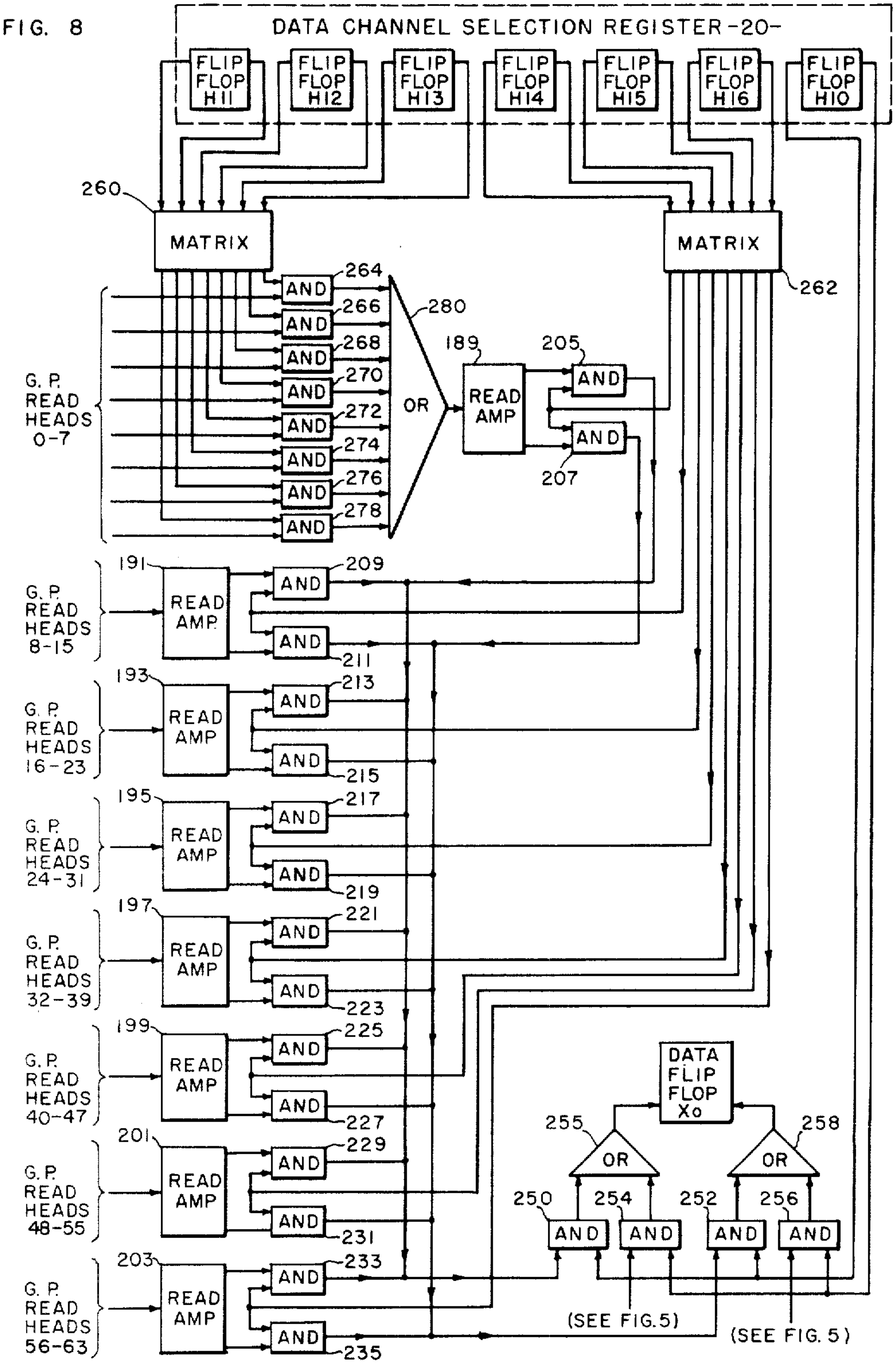
FIGURE 8 is a logic block diagram illustrating the manner in which the data words may be selected from a first group of different channels on the memory.

As shown in FIGURE 8, a group of "and" gates 205, 209, 213, 217, 221, 225, 229 and 233 are connected to an "and" gate 250; and a group of "and" gates 207, 211, 215, 219, 223, 227, 231 and 235 are connected to an "and" gate 252.

The "and" gate 250, and a further "and" gate 254 are connected to an "or" gate 255. The "and" gate 252, and a further "and" gate 256, are connected to an "or" gate 258. The "or" gates 255 and 258 are respectively connected to the set and reset input terminals of the data flip-flop X0.

The data channel selection register 20 is made up of a plurality of flip-flops H11, H12, H13, H14, H15, H16 and H10, as described above. One of the output terminals of the flip-flop H10 is connected to the "and" gates 250 and 252; and the other of the output terminals is connected to the "and" gates 254 and 256.

Figure 9:
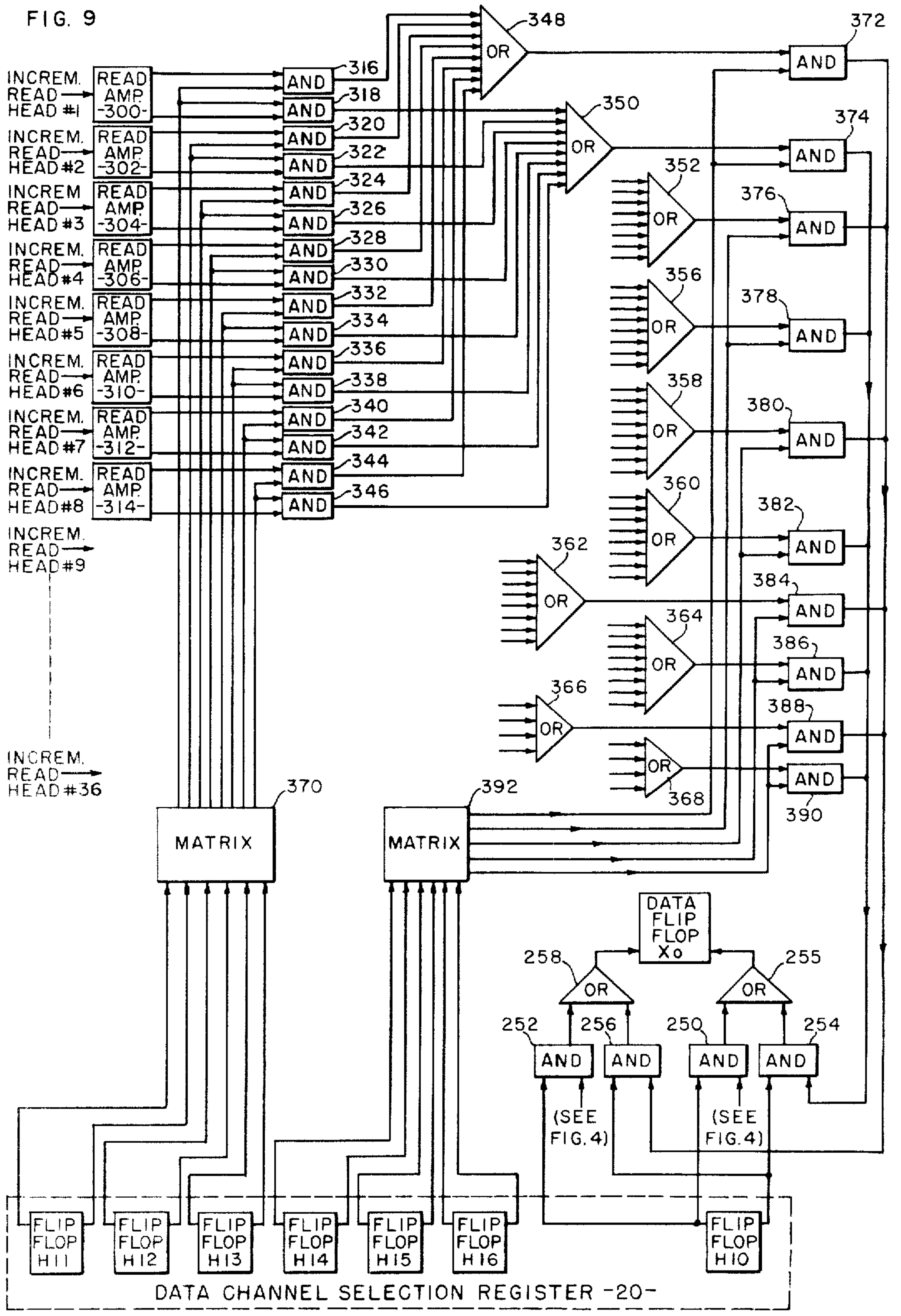
FIGURE 9 is a logic block diagram illustrating the manner in which the data words may be selected from other channels on the memory.

As described above, the data selection register 20 responds to the address portion of the "non-transfer" orders to select different ones of the general purpose read heads 0–63 of the system of FIGURE 8; or different ones of the incremental read heads 1–36 of the system of FIGURE 9. All these general purpose and incremental read heads, as described in conjunction with FIGURE 1, are associated with a single magnetic memory drum, such as the drum 12, and each of these read heads reads a different channel on the drum containing general purpose or incremental computer data.

When the flip-flop H10 of the data selection register 20 is in a first stable state, the "and" gates 250 and 252 are enabled, so that the logic circuitry of FIGURE 8 may introduce data information from a selected one of the general purpose read heads 0–63 to the data flip-flop X0. Conversely, when the flip-flop X0 is in a second of its stable states, the "and" gates 254 and 256 are enabled, so that the selected incremental read heads of FIGURE 9 may feed information to the data flip-flop X0.

The output terminals of the flip-flops H11, H12 and H13 of the data channel selection register 20 are connected to a matrix 260. This matrix and the matrix 262 form a part of the data channel selection matrix 16 of FIGURE 1. The matrix 260 has a plurality of output terminals which are connected to different ones of a plurality of "and" gates in several groups. One such group is illustrated as composed of a plurality of "and" gates 264–278. The general purpose read heads 0–7 are connected to different ones of the "and" gates 264–278. The other general purpose read heads 8–63 are connected similarly to other "and" gates (not shown) in like groups.

The output terminals of the flip-flops H14, H15 and H16 are connected to the matrix 262. The matrix 262 has a plurality of output terminals which are connected to the "and" gates 205–235. That is, the first output terminal of the matrix 262 is connected to the "and" gates 205 and 207; the second output terminal is connected to the "and" gates 209 and 211; the third output terminal is connected to the "and" gates 213 and 215; and so on.

A plurality of read amplifiers 189–193 are connected to the "and" gates 205–235 in a manner similar to the connections of the read amplifiers 188–202 in FIGURE 7.

The "and" gates 264–268 are connected to an "or" gate 280 which, in turn, is connected to the read amplifier 189. Similar connections are made to the read amplifiers 191–203.

When the data channel selection register 20 is set to indicate that one of the general purpose read heads 0–63 is to be selected, the flip-flop H10 is set to its first state to enable the "and" gates 250 and 252. The matrix 260 responds to the states of the flip-flops H11, H12 and H13 to enable one of the group of "and" gates 264, 266, 268, 270, 272, 274, 276 and 278 so as to select one of the general purpose read heads of the group 0–7. In like manner, a corresponding one of the general purpose read heads of each of the other groups is selected.

The flip-flops H14, H15 and H16 of the data selection register 20 cause the matrix 262 to develop a true output signal at one of its output terminals in response to the configuration of these flip-flops. This true signal enables a selected pair of the "and" gates 205, 207; 209, 211; 213, 215; and so on. This latter action causes the output from a selected one of the read amplifiers 189–203 to be introduced to the data flip-flop X0 through the enabled "and" gates 250 and 252.

Therefore, when the flip-flop H10 is in its first stable state, the configuration of the flip-flops in the data channel selection register 20 determines which one of the general purpose read heads 0–63 will introduce its output signal in a serial bit-by-bit manner to the data flip-flop X0.

When the flip-flop H10 of the data channel selection register 20 is in its other stable state, the "and" gates 254 and 256 are enabled, so that the selected one of the incremental read heads 1–36 will introduce its output signal in a bit-by-bit serial manner to the data flip-flop X0. This latter selection is carried out by the logic circuitry of FIGURE 9. As illustrated in FIGURE 9, the incremental read heads 1–8 are connected to corresponding read amplifiers 300, 302, 304, 306, 308, 310, 312 and 314. The remaining incremental read heads 9–36 are also connected to corresponding read amplifiers.

The read amplifier 300 is connected to a pair of "and" gates 316 and 318; the read amplifier 302 is connected to a pair of "and" gates 320 and 322; the read amplifier 304 is connected to a pair of "and" gates 324 and 326; the read amplifier 306 is connected to a pair of "and" gates 328 and 330; the read amplifier 308 is connected to a pair of "and" gates 332 and 334; the read amplifier 310 is connected to a pair of "and" gates 336 and 338; the read amplifier 312 is connected to a pair of "and" gates 340 and 342; and the read amplifier 314 is connected to a pair of "and" gates 344 and 346. The "and" gates 316, 320, 324, 328, 332, 336, 340 and 344 are connected to an "or" gate 348. The "and" gates 318, 322, 326, 330, 334, 338, 342 and 346 are connected to an "or" gate 350.

The "and" gates associated with the incremental read heads 9–16 are coupled through corresponding "and" gates to a pair of "or" gates 352 and 356. The incremental read heads 17–24 are coupled through corresponding "and" gates to a pair of "or" gates 358 and 360; the incremental read heads 25–32 are coupled through corresponding "and" gates to a pair of "or" gates 362 and 364; and the incremental read heads 33–36 are coupled through corresponding "and" gates to a pair of "or" gates 366 and 368.

The flip-flops H11, H12 and H13 of the data selection register 20 are also connected to a matrix 370. The matrix 370 has a plurality of output terminals which are connected to the "and" gates 316–346, and to the corresponding "and" gates (not shown) described above. The matrix 370 responds to different configurations of the flip-flops H11, H12 and H13 to enable different pairs of the "and" gates, such as of the "and" gates 316–346, so that the signals from different ones of the read amplifiers in each group, such as the read amplifiers 300–314, may be introduced to the corresponding "or" gates 348–368.

The "or" gate 348 is connected to an "and" gate 372, the "or" gate 350 is connected to an "and" gate 374, the "or" gate 352 is connected to an "and" gate 376, the "or" gate 356 is connected to an "and" gate 378, the "or" gate 358 is connected to an "and" gate 380; the "or" gate 360 is connected to an "and" gate 382, the "or" gate 362 is connected to an "and" gate 384, the "or" gate 364 is connected to an "and" gate 386, the "or" gate 366 is connected to an "and" gate 388, and the "or" gate 368 is connected to an "and" gate 390.

The flip-flops H14, H15 and H16 of the data channel selection register 20 are also coupled to a matrix 392. The matrices 370 and 392 may also form part of the data selection matrix 16 of FIGURE 1. The matrix 392 has a plurality of output terminals which are connected to different pairs of the "and" gates 372–390. That is, a first output terminal of the matrix 392 is connected to the "and" gates 372 and 374, a second output terminal is connected to the "and" gates 376 and 378, and so on. The "and" gates 374, 378, 382, 386 and 390 are connected to the "and" gate 254; and the "and" gates 376, 380, 384 and 388 are connected to the "and" gate 256.

As mentioned above, when the flip-flop H10 in the data channel selection register 20 is in its second stable state, the "and" gates 254 and 256 are enabled. Then, the matrix 370 responds to the configuration of the flip-flops H11, H12 and H13 to select a particular incremental read head in each group, and to cause the output signals from the selected incremental read head to be introduced to each of the "and" gates 372–390. The matrix 392 responds to the configuration of the flip-flops H14, H15 and H16 to enable a selected one of the "and" gates 372–390, so that the selected "and" gate may pass the signals to the data flip-flop X0. In this manner, the selected incremental read head introduces its output signals in a serial bit-by-bit manner to the data flip-flop X0 for application to the incremental computer 22 of FIGURE 4.

In the manner described, therefore, the improved computational system of the invention provides a means for obtaining orders and data simultaneously and continuously from a single memory system.

As described above, the logical system of the invention during each word time selects an order word from the memory, and each selected order is executed during the following word time. Once an order channel and sector are selected on the memory by a "transfer order," all successive "non-transfer" orders are taken from that channel in the order in which they appear on the memory drum and until another "transfer" order is encountered. There is therefore no "dead time" between the execution of such successive orders.

Each "non-transfer" order specifies a data channel on the memory drum, and any particular "non-transfer" order operates on whatever data word is read from the selected data channel during the word time in which the particular order is executed.

The computational system of the invention is rapid in operation in that it provides optimum maximum speed for a serial computer at any particular clock frequency. Moreover, the computational system of the invention is flexible in that orders or data may be read from any particular read head, and then passed to one of two utilization means, such as a digital or incremental computer.

What is claimed is:

1. A digital computer including: a rotatable magnetic memory drum member having a first group of peripheral channels storing multi-bit binary signals representing order words in successive sectors thereof, and having a second group of peripheral channels storing multi-bit binary signals representing data words in successive sectors thereof; computing means for acting on said data words as directed by said order words; an order channel selection matrix coupled to said memory drum and interposed between said first group of channels and said computing means; an order channel selection register coupled to said order channel selection matrix and to said computing means and responsive to orders from said computing means for causing said order channel selection matrix to pass signals from successive sectors of selected channels of said first group to said computing means in a serial bit-by-bit manner; a data channel selection matrix coupled to said memory drum and interposed between said second group of channels and said computing means; a data channel selection register coupled to said data signal selection matrix and to said computing means for causing said data channel selection matrix to pass signals from successive sectors of selected channels of said second group to said computing means in a serial bit-by-bit manner simultaneously with the passage of signals through said order channel selection matrix but with each data word passed by said data channel selection matrix being displaced one word time with respect to the passage of the order word relating thereto by said order channel selection matrix.

2. The system defined in claim 1 in which at least some of said order words each includes an address portion, and in which said data channel selection register responds to the address portion of the order word being executed by the computing means to control the data channel selection by said data channel selection matrix.

3. The system defined in claim 1 in which certain ones of said order words each includes a transfer address portion, and in which said order channel selection register responds to the transfer address portion of such an order word being executed by the computing means to control the order channel selection by said order channel selection matrix.

4. The system defined in claim 3 in which said certain ones of said order words each further includes a sector address portion; and which includes comparator circuitry for preventing the transmission of signals from a selected order channel until a particular sector therein, as indicated by said further address portion, is reached.

References Cited by the Examiner

UNITED STATES PATENTS

| | | | |
|---|---|---|---|
| 3,033,453 | 5/1962 | Lode | 235—152 X |
| 3,037,191 | 10/1962 | Crosby | 340—172.5 |
| 3,061,192 | 10/1962 | Terzian | 340—172.5 |
| 3,156,897 | 11/1964 | Bahnsen | 340—172.5 |

OTHER REFERENCES

June 1955: I.B.M. Manual of Operation for the 650 Magnetic Drum Data Processing Machine, Form 22–6060–1.

ROBERT C. BAILEY, *Primary Examiner.*

MALCOLM A. MORRISON, *Examiner.*

B. REIN, G. D. SHAW, *Assistant Examiners.*